United States Patent [19]
Booth et al.

[11] Patent Number: 5,967,764
[45] Date of Patent: Oct. 19, 1999

[54] AXIAL FAN WITH SELF-COOLED MOTOR

[75] Inventors: Jeff D. Booth, Maynard; Robert J. Van Houten, Winchester, both of Mass.

[73] Assignee: Bosch Automotive Systems Corporation, Waltham, Mass.

[21] Appl. No.: 08/907,557

[22] Filed: Aug. 8, 1997

[51] Int. Cl.[6] .................................................. F04B 35/04
[52] U.S. Cl. ...................... 417/423.8; 417/368; 417/370; 416/169 A
[58] Field of Search ..................... 417/368, 370, 417/423.5, 423.7, 423.8, 423.14; 416/169 A, 198 R, 175, 201 A, 203

[56] References Cited

U.S. PATENT DOCUMENTS

| | | | |
|---|---|---|---|
| 2,294,586 | 9/1942 | Troller | 417/368 |
| 2,661,146 | 12/1953 | Hill et al. | 417/365 |
| 2,819,675 | 1/1958 | Gilman | 416/175 |
| 3,731,121 | 5/1973 | Cook et al. | 310/227 |
| 4,092,556 | 5/1978 | Mabuchi | 310/57 |
| 4,153,389 | 5/1979 | Boyd | 416/201 A |
| 4,659,951 | 4/1987 | Angi et al. | 310/62 |
| 4,883,982 | 11/1989 | Forbes et al. | 310/62 |
| 5,180,279 | 1/1993 | McLane-Goetz et al. | 415/177 |
| 5,217,353 | 6/1993 | De Filippis | 417/368 |
| 5,283,493 | 2/1994 | Hokanson et al. | 310/227 |
| 5,645,401 | 7/1997 | Martin et al. | 416/169 A |

FOREIGN PATENT DOCUMENTS

| | | |
|---|---|---|
| 0569738 A1 | 11/1993 | European Pat. Off. . |
| 3301918 A1 | 7/1984 | Germany . |
| 3933868 A1 | 5/1991 | Germany . |

*Primary Examiner*—Charles G. Freay
*Attorney, Agent, or Firm*—Fish & Richardson P.C.

[57] ABSTRACT

A fan and electric motor combination (or a fan adapted to be used in such a combination) which provides improved cooling for the motor, using a centrifugal impeller including rotating impeller blades. The impeller blades span between an impeller inlet and an impeller outlet, and they rotate to assist cooling airflow for the motor. Cooling airflow is also assisted by the position of the impeller in that the impeller outlet is positioned upstream of an intersection of the fan blade trailing edge and the hub. Therefore, cooling airflow is assisted by at least some (preferably all) of the pressure drop across the axial fan. If the impeller outlet is positioned still further upstream, e.g., upstream of an intersection of the fan blade leading edge and the hub, then the motor cooling airflow is assisted by all or nearly all of the pressure drop across the axial fan.

12 Claims, 15 Drawing Sheets

AXIAL FAN WITH SELF-COOLED MOTOR

FIELD OF THE INVENTION

This invention is in the general field of electric motor-driven axial fans, particularly fans used in automotive engine cooling applications.

BACKGROUND OF THE INVENTION

Internal motor temperature has a critical effect on the performance and durability of electric motors. The internal temperature of an electric motor is greater than the ambient temperature due to the heat generated by the motor. In automotive engine cooling applications where the electric motor is under the hood of the vehicle the problem is made more severe by the high ambient temperatures produced by the vehicle's engine. Certain features may operate to reduce motor temperature rise over ambient temperature rise.

McLane-Goetz et al. U.S. Pat. No. 5,180,279 disclose a fan which includes a scoop downstream of an axial fan to divert some of the axial fan airflow across the rear of the motor.

DeFilippis U.S. Pat. No. 5,217,353 discloses a centrifugal blower motor having a stationary motor casing with holes for taking in air from the outside and for ventilating the interior of the motor; the motor also has a rotary part with holes which act as outlet ducts for the internal motor ventilation.

Ribs of the fan driven by the motor which are primarily structural can have the additional benefit of cooling the motor.

SUMMARY OF THE INVENTION

One aspect of the invention features a fan and electric motor combination (or a fan adapted to be used in such a combination) which provides improved cooling for the motor. This aspect of the invention generally features a centrifugal impeller comprising an inlet, an outlet, and rotating blades. The inlet is positioned to receive the motor-cooling airflow. The rotating blades cause the pressure at the impeller outlet to be greater than at the inlet. The pressure of the motor-cooling airflow is further increased by positioning the impeller outlet upstream of an intersection of the fan blade trailing edge and the hub (here upstream is interpreted in terms of the general, bulk airflow regardless of local anomalies). Therefore, at least some (preferably all) of the pressure rise across the axial fan is added to the pressure rise of the impeller. If the impeller outlet is positioned still further upstream, e.g., upstream of an intersection of the fan blade leading edge and the hub, then the pressure rise of the impeller is increased by all or nearly all of the pressure rise across the axial fan. The resulting pressure rise overcomes the pressure losses of the motor-cooling flow path, and results in greater motor-cooling airflow.

In referring to axial flow fans, we recognize that the general flow of air through axial fans may be entirely axial or the flow may be mixed, in which case there may be a significant component of radial flow.

Typically, but not inevitably, the motor will include an outer casing. The invention provides some advantage for motors having a sealed outer casing, in that the impeller generates motor-cooling airflow along the outside of the motor casing. The invention is particularly advantageous for motors having a casing with at least one casing inlet and at least one casing outlet positioned near the impeller inlet, so that rotation of the impeller assists motor-cooling airflow through the inside of the motor—i.e., through the casing inlet, into the inside of motor casing, and through the casing outlet to the impeller inlet.

In one embodiment, the impeller blades are positioned between a forwardly-facing central region of the hub and a bottom plate spaced axially in front of the forwardly-facing central hub region. The central hub region serves as a top plate of the centrifugal impeller. Alternatively, there can be a top plate separate from the hub and the bottom plate.

In other embodiments, the fan hub comprises a rearwardly-facing, concave, central region, constructed to serve as a bottom plate and a top plate spaced axially rearward of the central hub region. The impeller blades are positioned between the rearwardly-facing region and the top plate. Typically, the impeller blades are connected to the fan hub, so that hub rotation drives the impeller blades. Alternatively, the motor casing may serve as the top plate or a portion of the top plate. In this embodiment, the motor casing may include a flange constructed to serve at least part of the top plate of the centrifugal impeller.

For motors in which at least part of the motor casing rotates with the fan hub, the impeller blades may be attached to the motor casing. For motors in which the motor casing is stationary, the assembly may include a seal (e.g., an extension from the hub toward the casing, or an extension from the casing toward the hub, or both) to reduce a gap between the casing and the hub.

A rotatable motor driveplate may be connected to the motor, and at least a portion of the impeller blades may be attached to that driveplate, so that the motor drives the impeller blades. The driveplate may serve as either the top plate or the bottom plate. The driveplate may include a seal. The impeller blades and the driveplate may be made of metal to improve heat transfer from the motor to the cooling airflow.

The fan and impeller blades may be formed of injection-molded plastic material. In some cases, the fan and impeller blades are molded as a single unit. The fan, impeller blades and either the top plate, the bottom plate, or both, can be molded as a single unit. In another case, the impeller blades and either the top plate, the bottom plate, or both, can be molded as a single unit.

The above-described fan and motor combinations may be used to move air through an adjacent heat exchanger in a vehicle.

The above-described fan/motor combinations may be assembled by attaching the motor to the fan.

Other features and advantages will be apparent from the following description and from the claims.

DESCRIPTION OF THE PREFERRED EMBODIMENTS

Figures 1A, 1B:
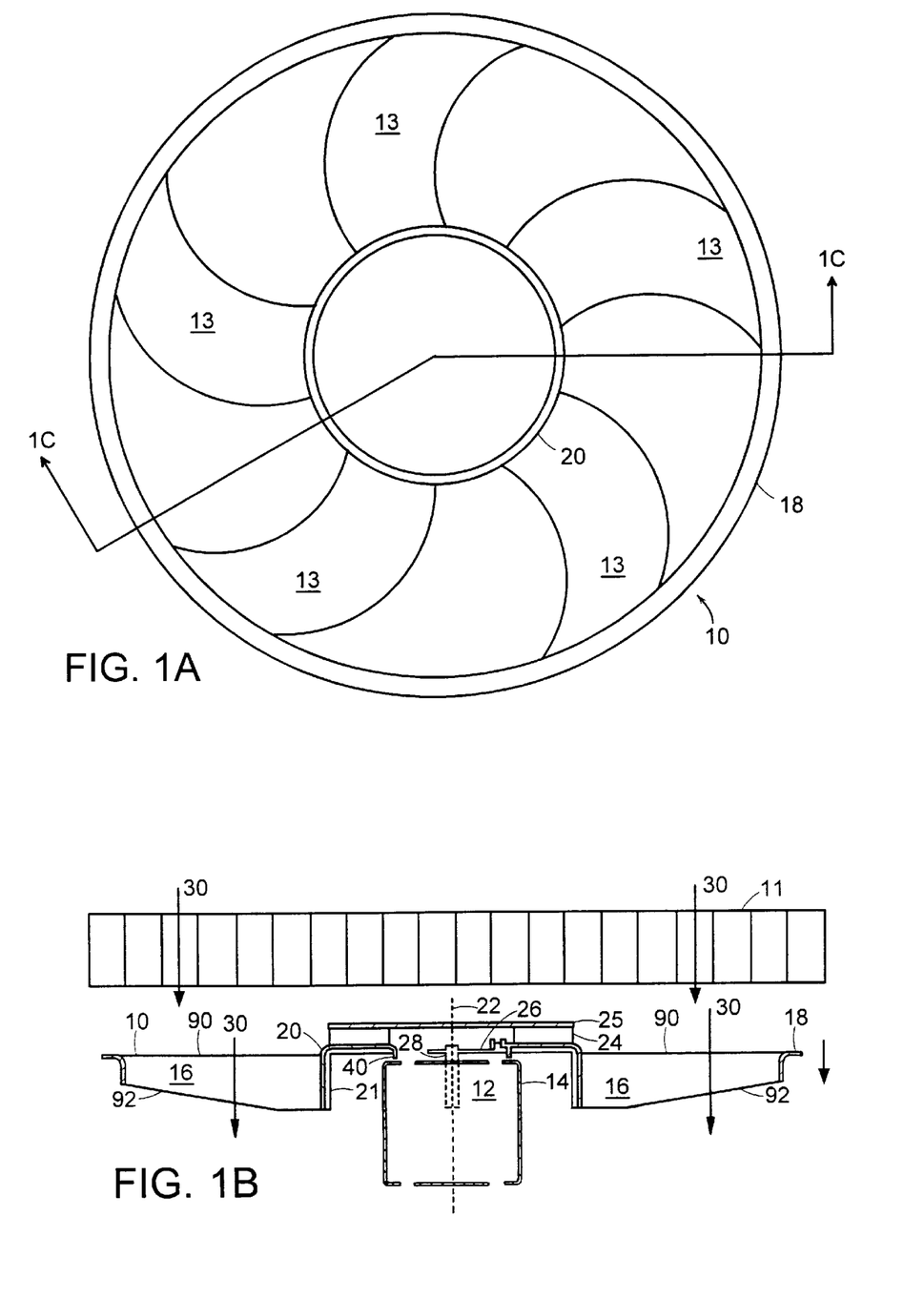
FIGS. 1A and 1B are diagrammatic representations of an axial cooling fan for an electric motor.

In FIGS. 1A and 1B, an axial fan 10 is used to "pull" air through a heat exchanger 11 upstream (from the point of view of mainstream airflow) of the fan. Fan 10 is driven by a motor 12 enclosed in a motor casing 14. Fan 10 includes a series of blades 16 integrally connected to a rotating band 18 and a hub 20 that is structurally reinforced with ribs 21. Blades 16, each having a leading edge 90 and a trailing edge 92, extend in a plane generally perpendicular to axis 22 of the fan and motor. Each blade 16 has a low-pressure surface 13 facing in the general direction of the upstream side of fan 10 and a high pressure surface (not shown) facing generally towards the downstream side of fan 10.

Figure 1C:
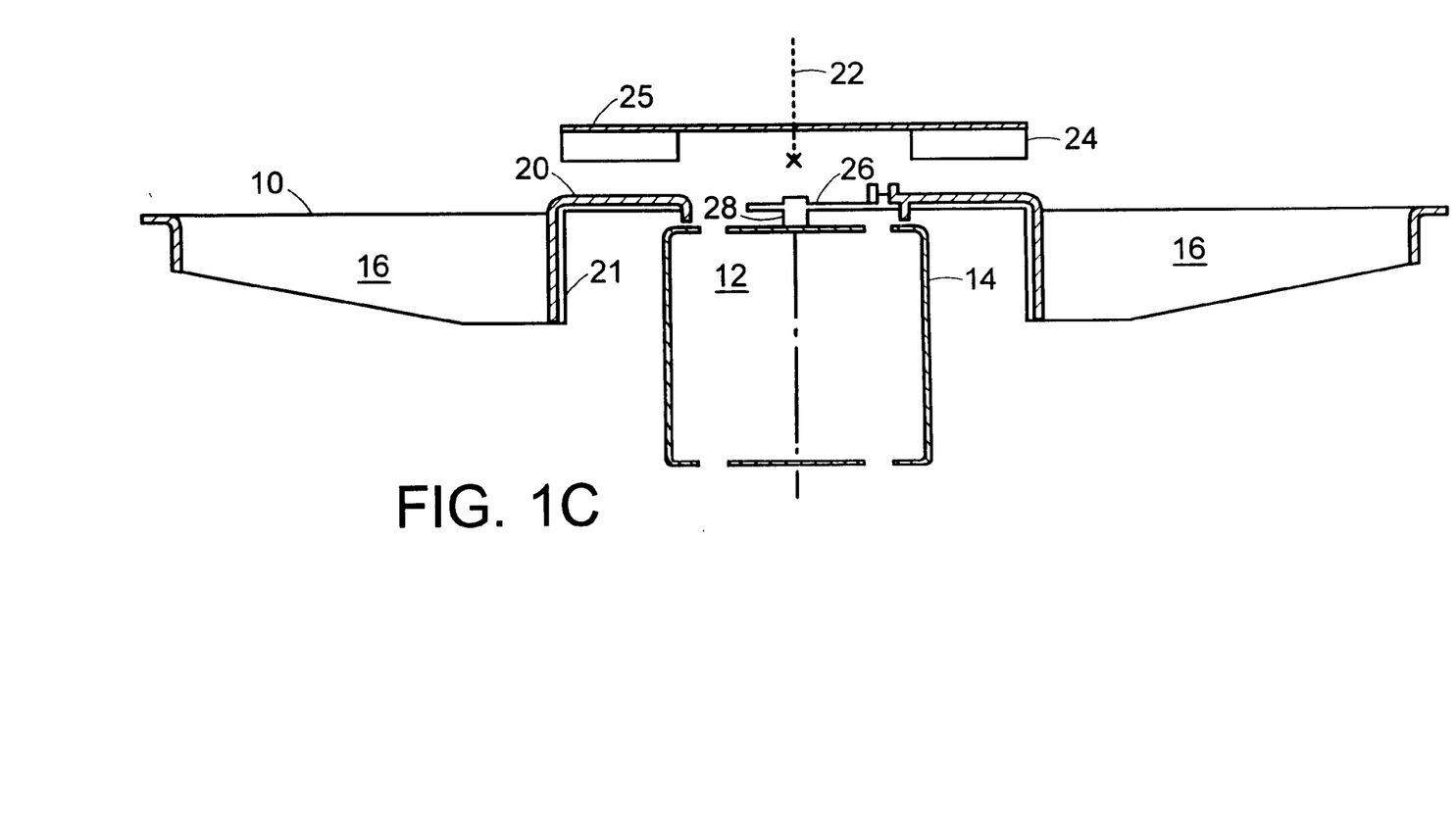
FIG. 1C is an exploded view of the fan of FIGS. 1A and 1B, showing the bottom plate and impeller blades separated from the rest of the assembly for illustration purposes.

To cool motor 12, multiple (for example, at least 5) impeller blades 24 are attached to bottom plate 25, and they extend between bottom plate 25 and hub 20. Blades 24 extend generally perpendicularly to axis 22. The combination of hub 20, plate 25, and blades 24 define the flow path of a centrifugal blower, with an inlet radially inward from its outlet. In a preferred embodiment, blades 24 and bottom plate 25 are molded as one piece as shown in FIG. 1C (parts are shown in an exploded view with blades 24 separated from hub 20 for purposes of clarity), and fan 10 is molded as another unit.

Hub 20 is attached to drive plate arms (for example, at least 3), of which only arm 26 is shown for sake of clarity, which are integrally connected with shaft 28. In use, motor casing 14 remains stationary and motor 12 causes shaft 28 to rotate such that all the other above stated connected elements rotate about axis 22 as a single unit.

Figure 1D:
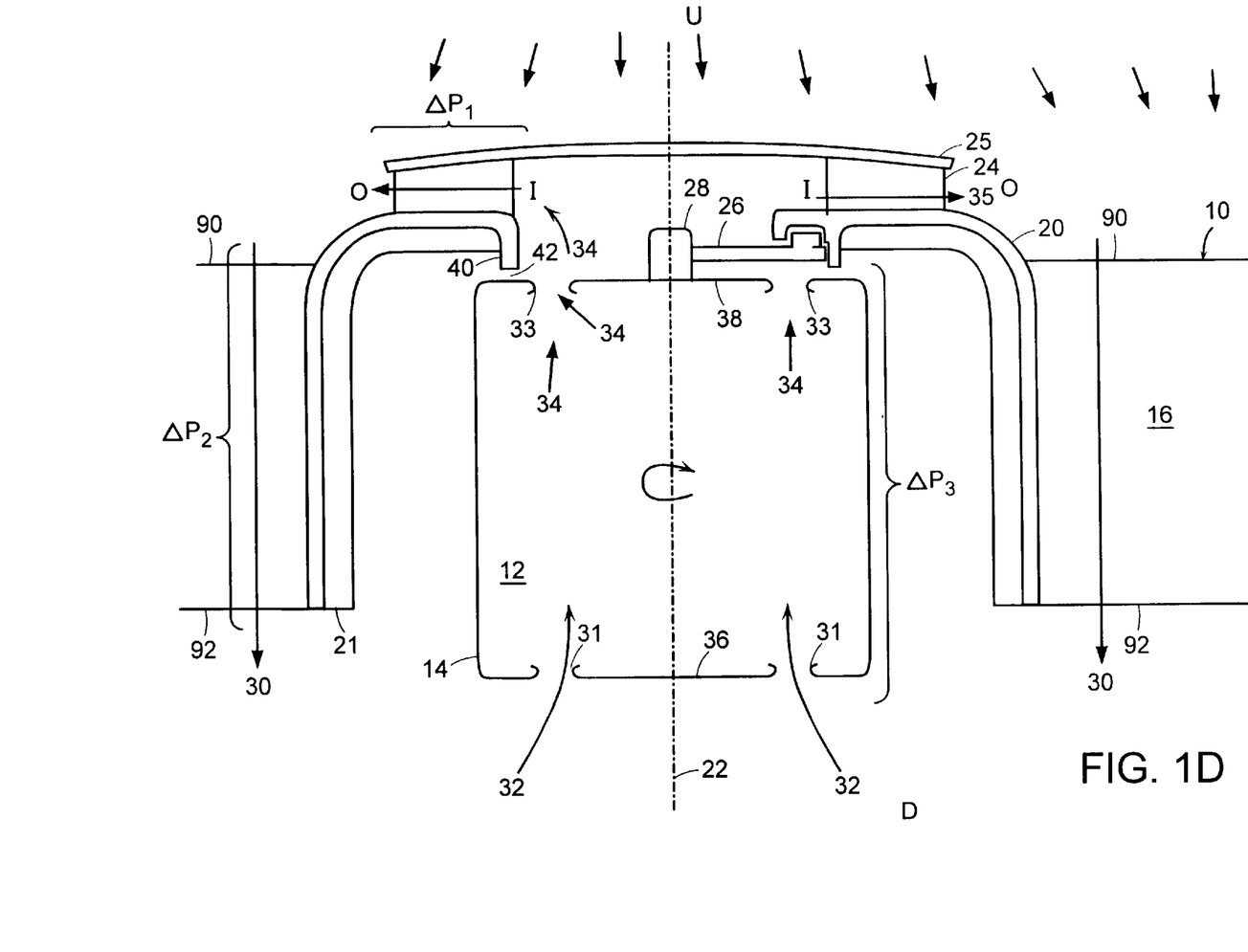
FIG. 1D is an enlarged view of the motor casing and hub of FIG. 1A.

Shown in FIG. 1D is the airflow pattern induced by the fan/blower unit. As fan 10 rotates about axis 22, blades 16 draw air from the general upstream region (U) of fan 10 and they move the air through fan 10 to a general downstream region (D) as indicated by arrows 30 (as also shown in FIG. 1B). The induced airflow through fan 10 experiences a pressure increase $\Delta P_2$.

The air is pulled from region (D) through inlet apertures 31 into motor casing 14 as shown by flow arrows 32. The air flows through the interior of motor 12, thereby cooling it, and is expelled through cooling apertures 33 as indicated by flow arrows 34. The airflow is then turned from a generally axial and tangential direction to a generally radial and tangential direction as it moves from cooling apertures 33 through the inlet (I) of impeller blades 24 to the outlet (O) of the blades as shown by flow arrows 35. As the air moves through impeller blades 24 of the centrifugal blower, it experiences a pressure rise $\Delta P_1$.

The pressure increase $\Delta P_1$ through impeller blades 24 and $\Delta P_2$ through fan 10 is balanced by a pressure drop $\Delta P_3$ that occurs as the airflow moves through motor 12, entering through apertures 31 and exiting through apertures 33, as shown by the relation $\Delta P_1 + \Delta P_2 = \Delta P_3$.

When the fan/motor is in operation, the airflow pattern just described continuously cools the interior of motor 12. To provide more heat rejection for the internal parts of motor 12, and to improve motor performance and durability, a sealing device 40 is employed to ensure that the airflow goes through the interior of the motor casing and not along the outside of the casing. Sealing device 40 is an extension of hub 20 extending axially towards motor casing top 38, defining a clearance gap 42 determined by manufacturing tolerances and design considerations. The inner radius, from axis 22, of sealing device 40 is slightly larger than the outermost edges of cooling apertures 33 so as not to interfere with the airflow exiting cooling apertures 33.

Figure 1E:
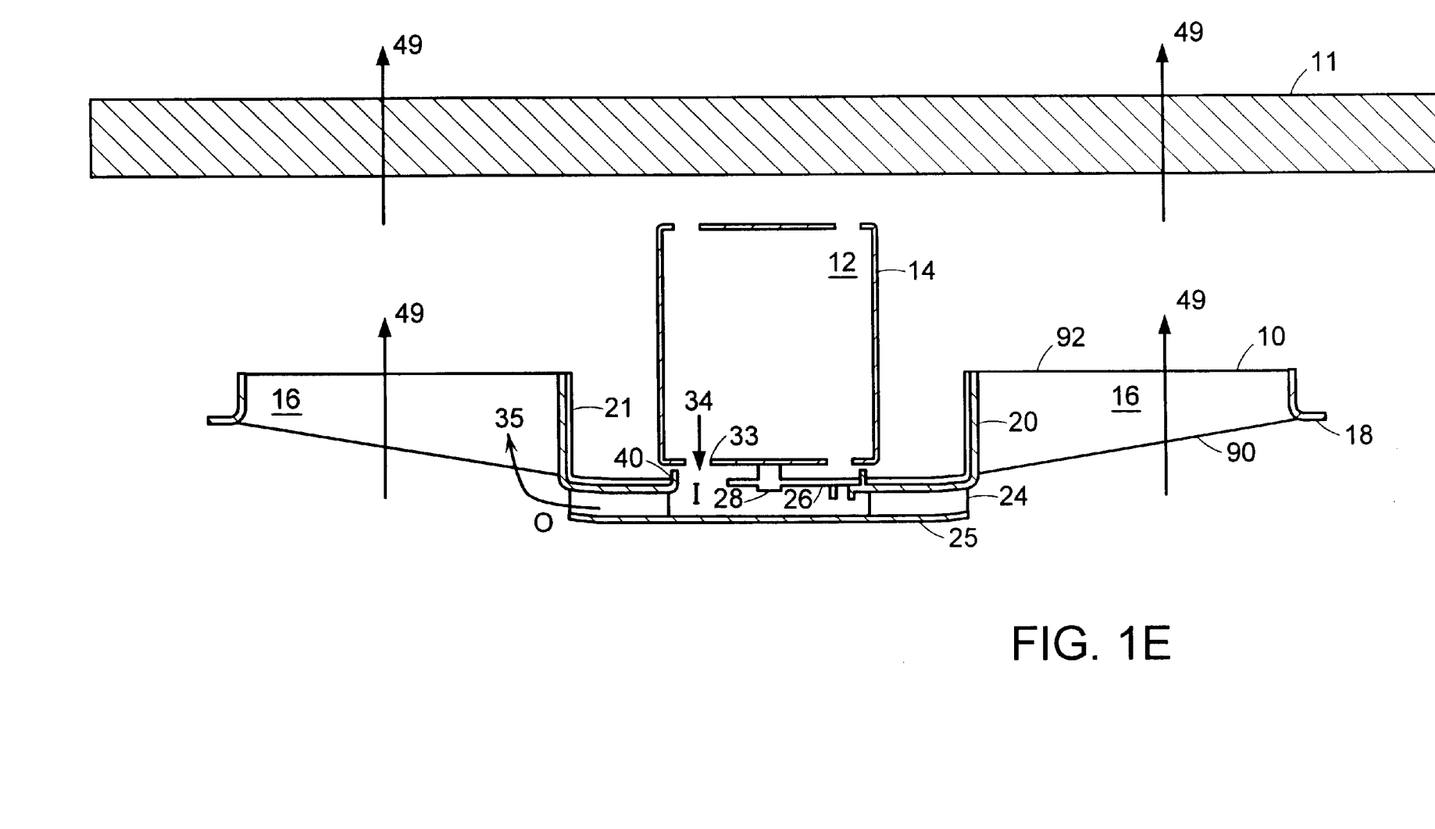
FIG. 1E is a diagrammatic representation of an axial cooling fan for an electric motor for pushing air through a heat exchanger.

Referring to FIG. 1E, a motor/fan combination is arranged to "push" air, in the direction indicated by arrows 49, through heat exchanger 11 downstream (from the point of view of mainstream airflow) of the fan. Motor cooling air exits motor casing 14 and enters inlet (I) of impeller blades 24, as shown by arrow 34, and then flows through the impeller, exiting at the outlet (O). From the outlet (O), the cooling airflow enters into the mainstream airflow as indicated by arrow 35. All other identified elements are the same as those described above with reference to FIG. 1B.

Figure 1F:
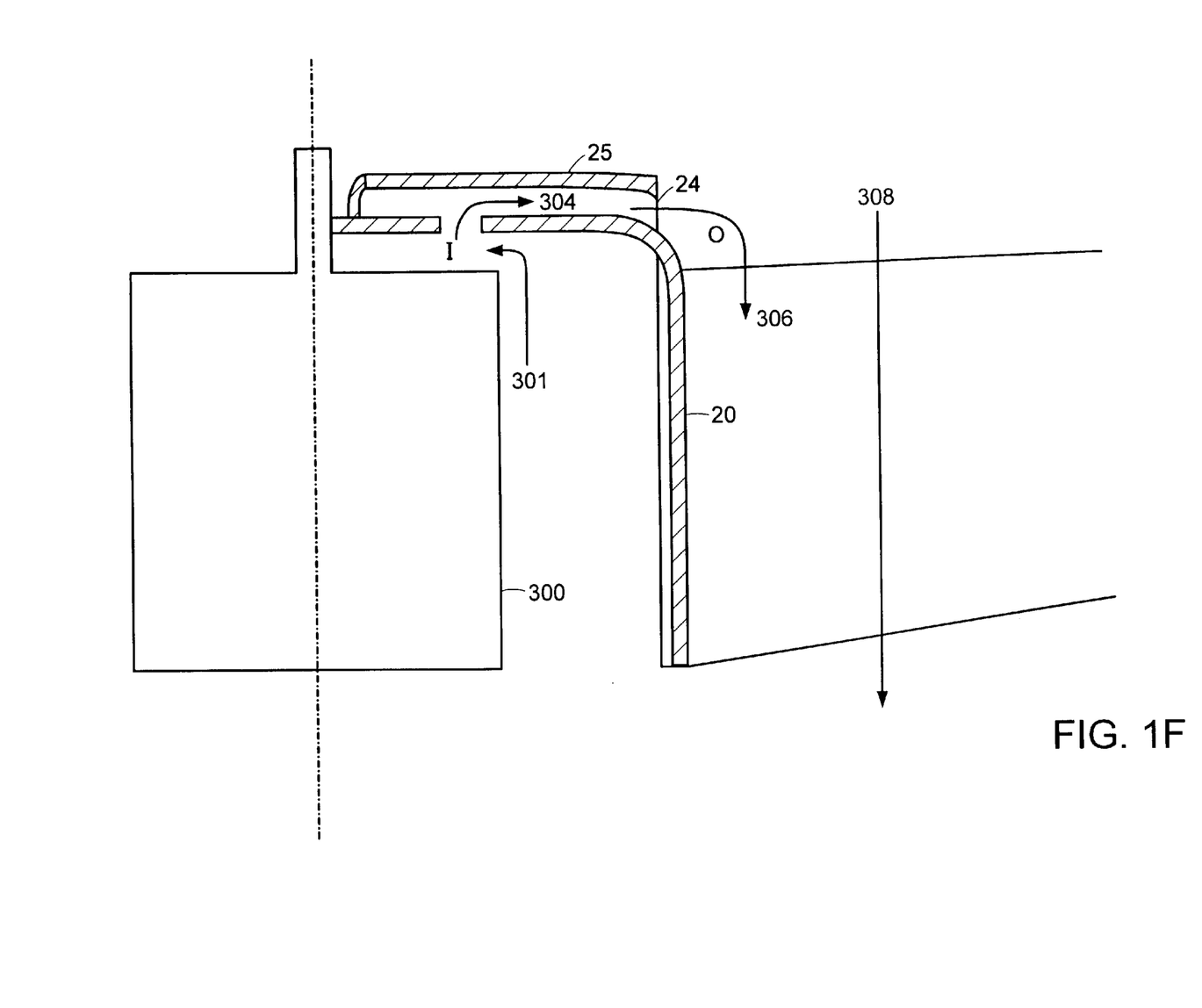
FIG. 1F is a diagrammatic view of a sealed motor casing.

Referring to FIG. 1F, a sealed motor casing 300 is shown. In this embodiment, the motor cooling air flows along the outside of motor casing 300 in the general direction of arrow 301. The airflow enters inlet (I) of the impeller and flows through impeller blades 24, as indicated by arrow 304. Upon exiting the outlet (O) of the impeller, the airflow, indicated by arrow 306, enters the mainstream airflow, flowing in the general direction of arrow 308.

Other embodiments of the invention will now be described. The same element numbers used in FIGS. 1A through 1D will be used to identify similar elements in FIGS. 2 through 8.

Figure 2:
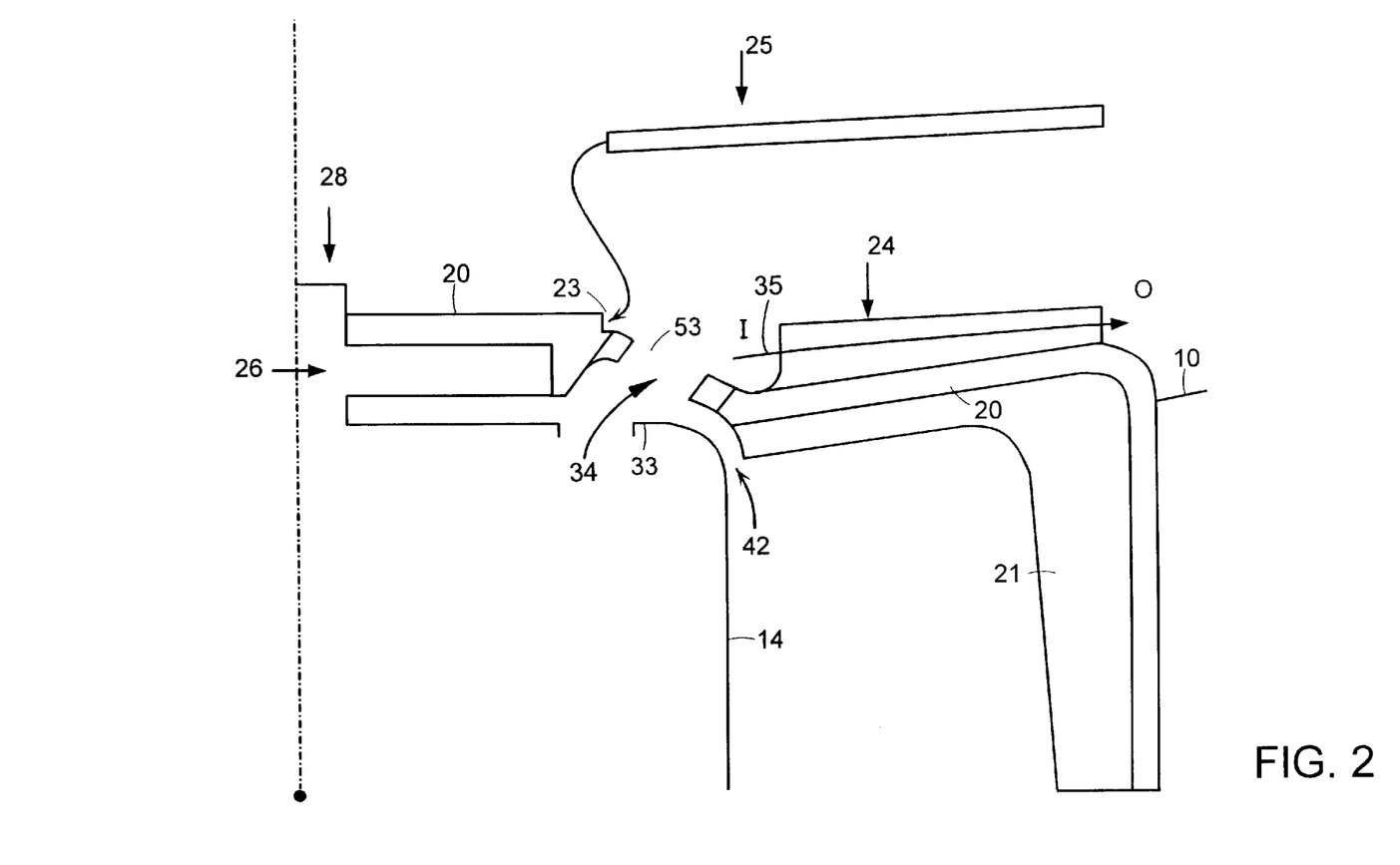
FIG. 2 is a diagrammatic view of an axial cooling fan having the impeller blades integrally connected with the hub of the axial fan.

In FIG. 2, bottom plate 25 is a separately formed piece and impeller blades 24 are connected integrally with top of fan hub 20 such that impeller blades 24 and fan 10 are molded as a single unit. By having impeller blades 24 molded together with fan 10, impeller blades 24 provide additional structural support to hub 20. Bottom plate 25 is shown separated from impeller blades 24 for illustration purposes; in operation, bottom plate 25 would be centered relative to hub 20 by a groove 23 and connected to impeller blades 24, for example, by a heat-welding process. In other embodiments, bottom plate 25 could be snapped onto hub 20. The operation of the fan/motor shown in FIG. 2 is generally the same as that described in reference to FIGS. 1A through 1D, except that the airflow, upon exiting cooling apertures 33, flows through hub holes 53 disposed near the inlet (I) of impeller blades 24 prior to moving through the blades to the outlet (O) region of the impeller blades.

Figure 3A:
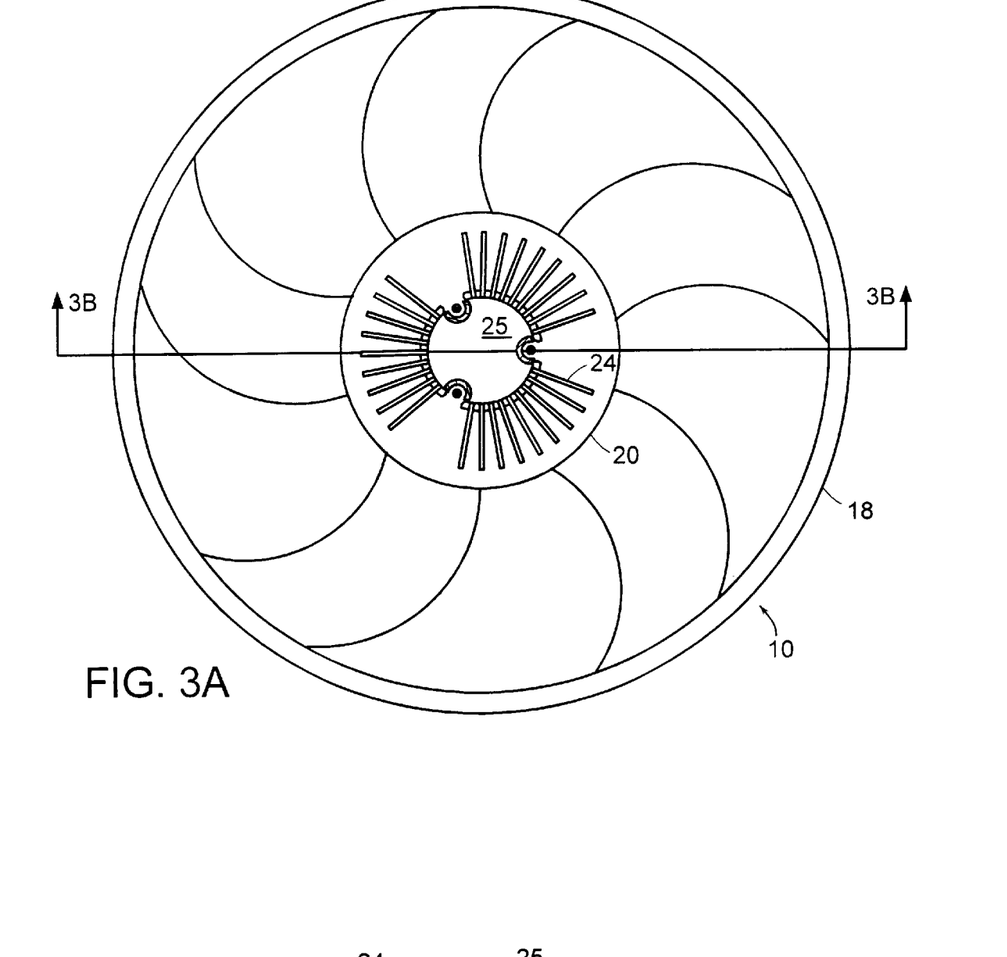
FIGS. 3A and 3B are diagrammatic views of an axial cooling fan with impeller blades having an outer radius greater than the radius of the bottom plate.
Figure 3B:
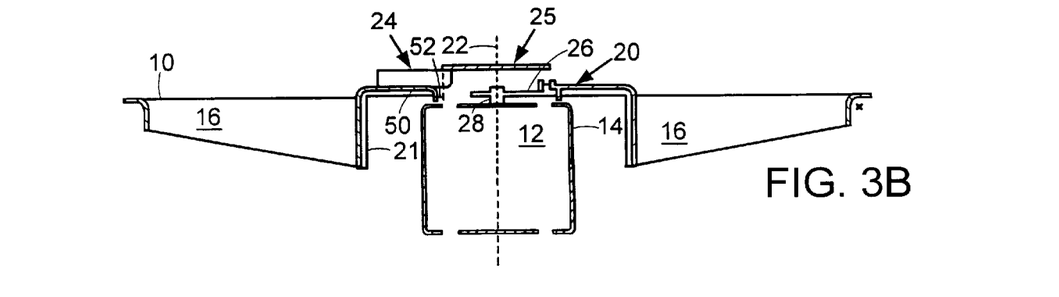

With reference to FIG. 3, an illustration of an embodiment is shown in which bottom plate 25 is attached to a set of impeller blades 24 integrally molded with fan 10, where bottom plate 25 does not extend out to the outer radii of impeller blades 24. In addition, top plate 50 formed by hub 20 does not extend inward to the inner radii of impeller blades 24 thereby leaving an annular gap 52 breached only by impeller blades 24. This enables fan 10, impeller blades 24, and bottom plate 25 to be molded as a single unit.

Figure 4:
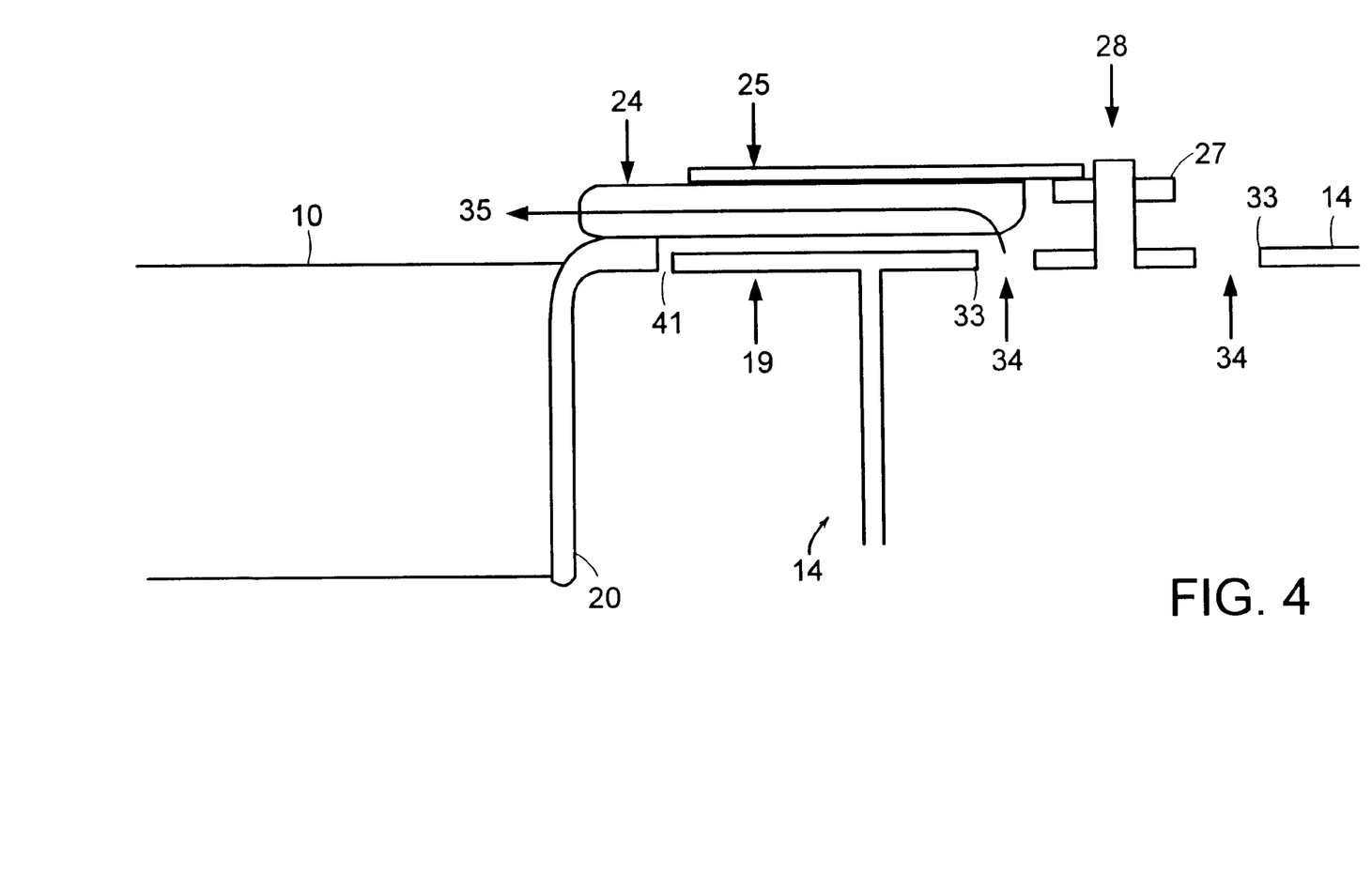
FIG. 4 is a diagrammatic view of an axial cooling fan having a motor casing with a flange serving as the top plate.

In another embodiment, as shown in FIG. 4, a flange 19 connected to motor casing 14 and extending outwardly towards hub 20 serves as a top plate. Alternatively, the motor casing may not have a flange in which the motor casing diameter is large enough so that at least a portion of the motor casing serves as the top plate. When the fan/motor is in operation, air flows through motor casing 14 in the direction indicated by arrows 34 through the cooling apertures 33. The airflow turns and flows through a series of flow paths formed by the combination of flange 19, impeller blades 24 and bottom plate 25, bottom plate 25 being attached to driveplate 27 integrally connected to shaft 28. A sealing device is formed by minimizing the gap 41 between flange 19 and hub 20.

Figure 5:
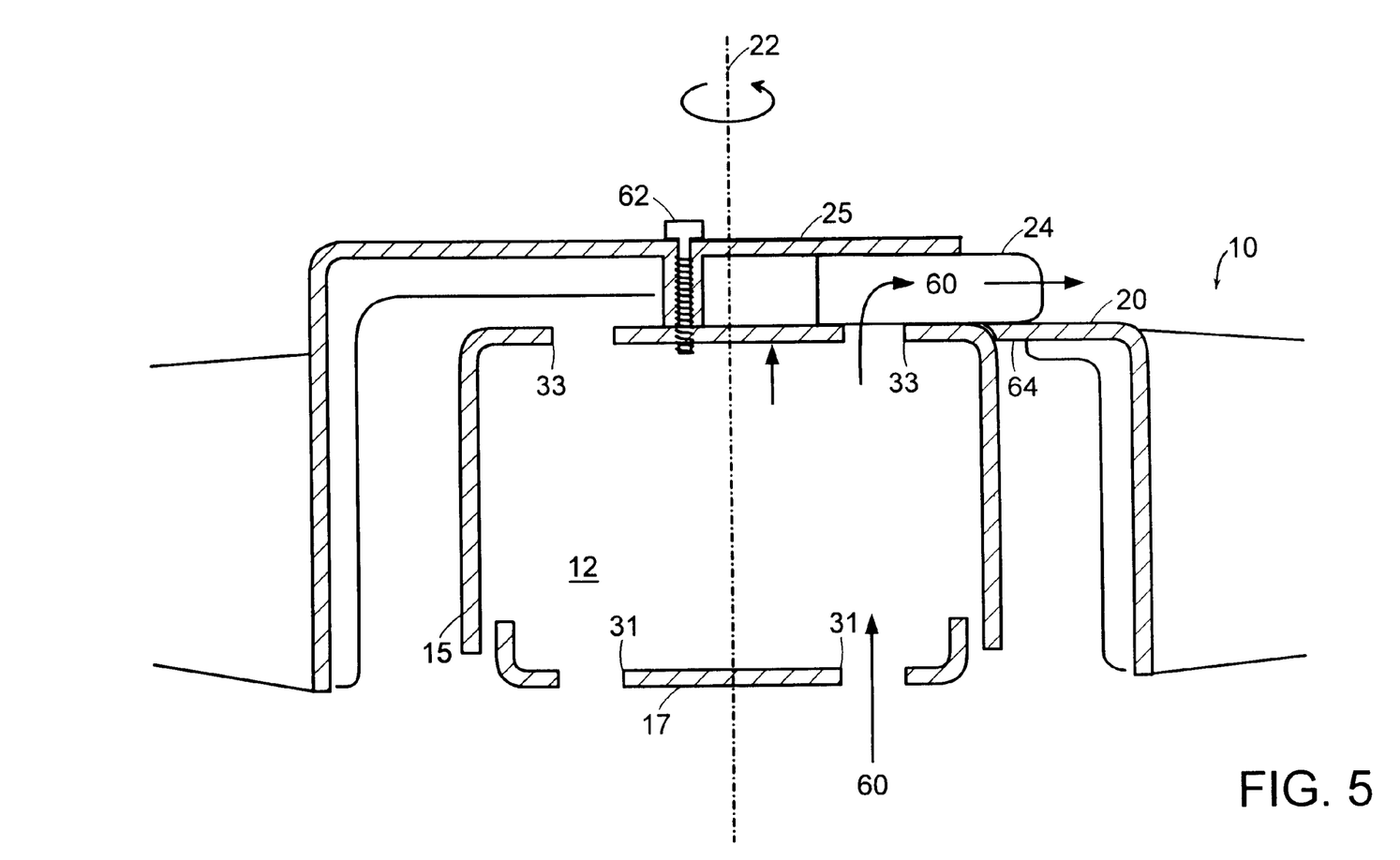
FIG. 5 is a diagrammatic view of an axial cooling fan with a rotating motor case.

Referring to FIG. 5, an embodiment of the fan/motor is shown in which fan 10, impeller blades 24 and bottom plate 25 can be connected together to form a single piece that is attached, for example, with screw 62, to a rotatable outer motor casing 15. When the fan/motor is in use, fan 10, impeller blades 24, bottom plate 25 and outer motor casing 15 rotate about axis 22 while inner motor casing 17 remains stationary. Air flows in the general direction of arrow 60 into the interior of motor 12 through inlet apertures 31 and exits outer motor casing 15 through cooling apertures 33 and finally moves in a radial and tangential direction through impeller blades 24. Similar to that described in a previous embodiment (FIG. 1C), sealing device 64 prevents the airflow from flowing across the outside of motor casing 15 and ensures that the flow is directed through the interior of motor 12, although, unlike that shown in FIG. 1C, hub 20 may be in contact with outer motor casing 15.

Alternatively, outer motor casing 15 can be integrally connected to impeller blades 24, in which bottom plate 25, integral with fan hub 20, is attached to outer motor casing 15 with screw 62.

In another arrangement (not shown), the fan/hub/impeller combinations shown in FIGS. 1B, 2, and 7 (to be described below), each showing a motor with stationary casing 14, can be used in combination with a motor having the rotatable outer motor casing 15.

Figure 6A:
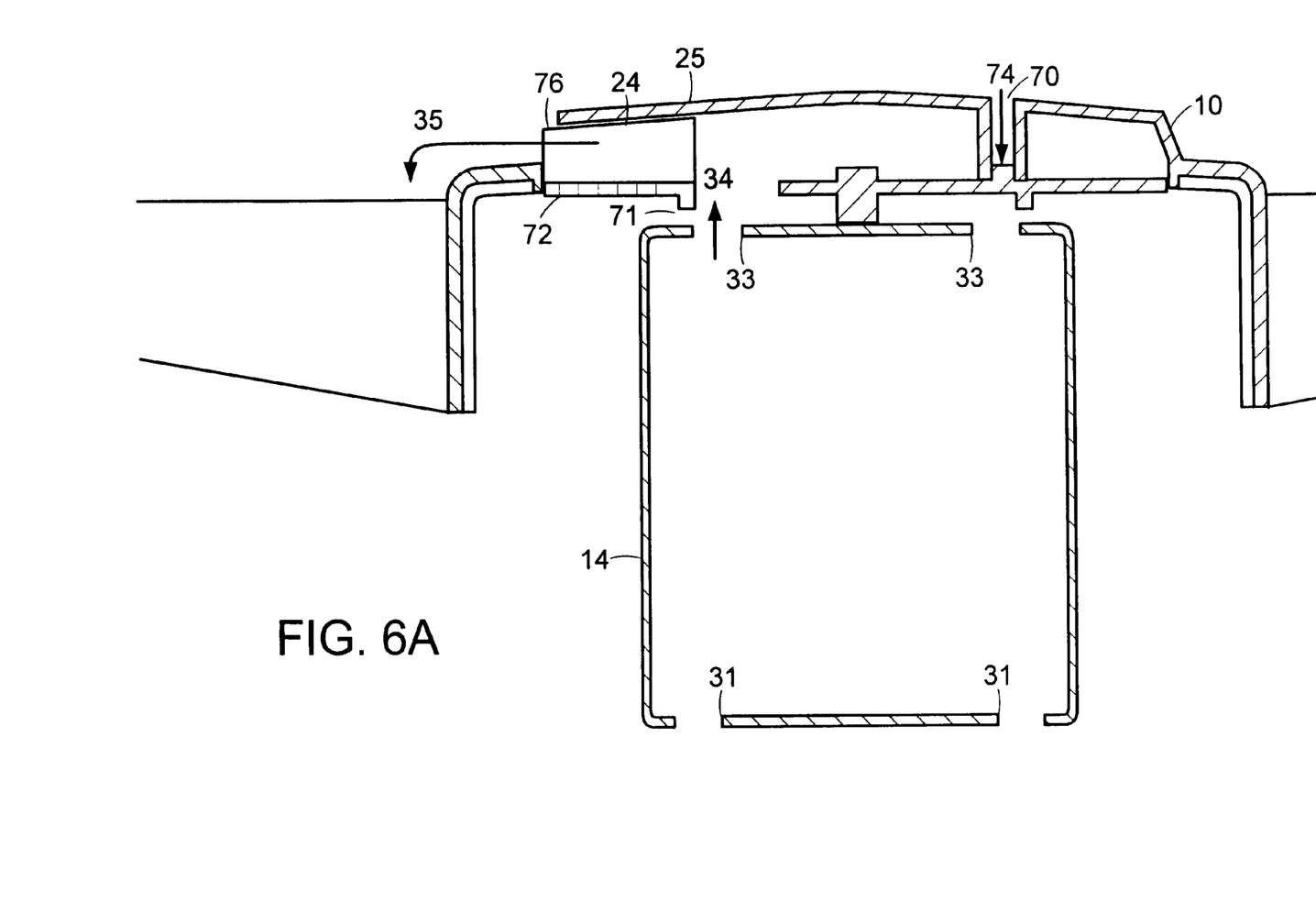
FIGS. 6A and 6B are diagrammatic views of an axial cooling fan having the impeller blades integral with the fan/motor driveplate attachment.
Figure 6B:
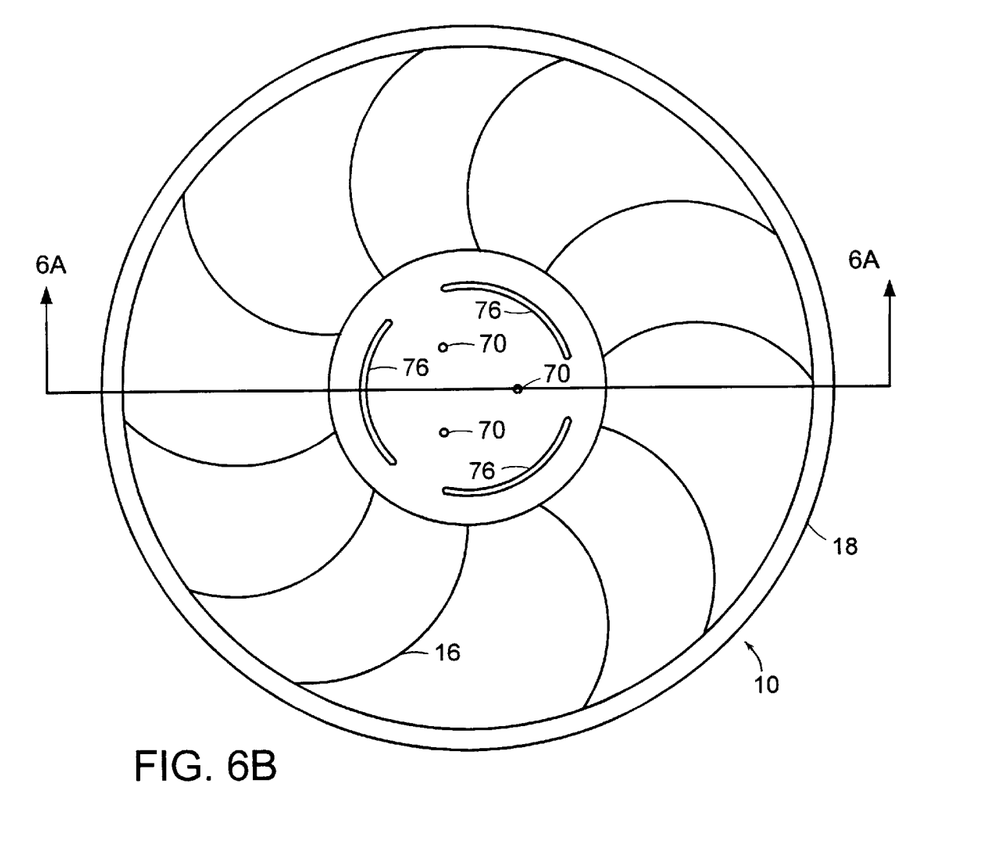

In the embodiment shown in FIGS. 6A and 6B, impeller blades 24 are integral with a fan/motor driveplate attachment 72 so that driveplate/impeller blades unit serves as a top plate. Bottom plate 25 is attached to driveplate attachment 72 by a threaded bolt (not shown) placed through hole 70 and securely engaged with a threaded portion 74 of the driveplate attachment. A portion of driveplate attachment 72 extends axially towards housing 14 thereby defining a gap 71. By minimizing this gap, a sealing device is formed. In use, air flows out cooling apertures 33 of motor casing 14 through the flow paths formed by impeller blades 24, bottom plate 25 and driveplate attachment 72 and out through slots 76, as indicated by arrow 35.

Figure 6C:
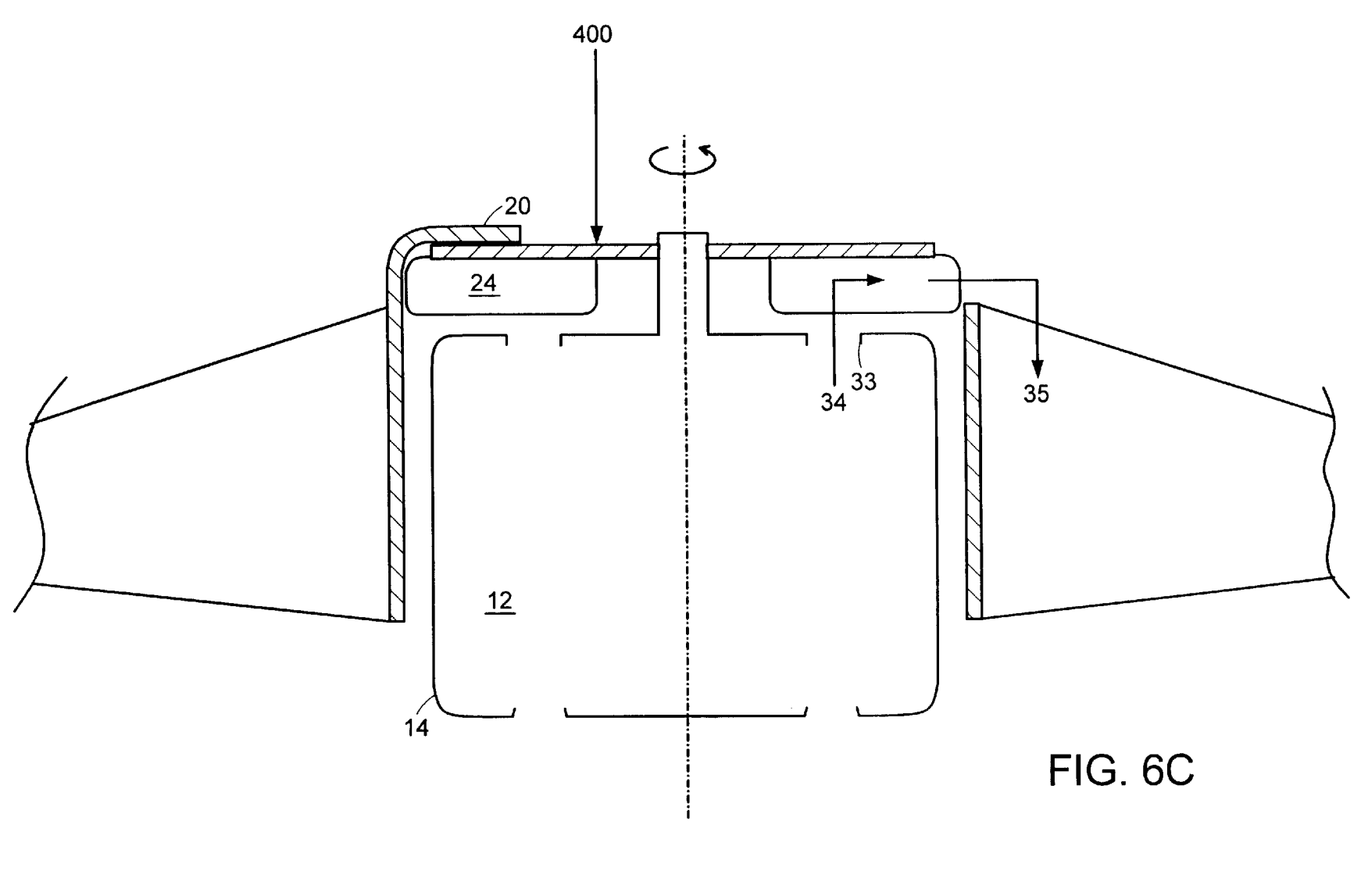
FIG. 6C is a diagrammatic view of a fan/motor combination in which a driveplate serves as a bottom plate.

Referring to FIG. 6C, a fan/motor combination is shown in which a driveplate 400 is integral with impeller blades 24 such that the driveplate/impeller blades unit serve as a bottom plate. The airflow moves through motor casing 14 and impeller blades 24 as indicated by arrow 34. After exiting the impeller, the airflow then turns and enters the mainstream airflow as shown by arrow 35.

In another arrangement, impeller blades 24 and fan/motor driveplate attachment 72 can be made of metal. The metal components act as a heat exchanger drawing heat from the motor armature through the shaft and rejecting heat from the motor blades to the induced cooling air.

Figure 7A:
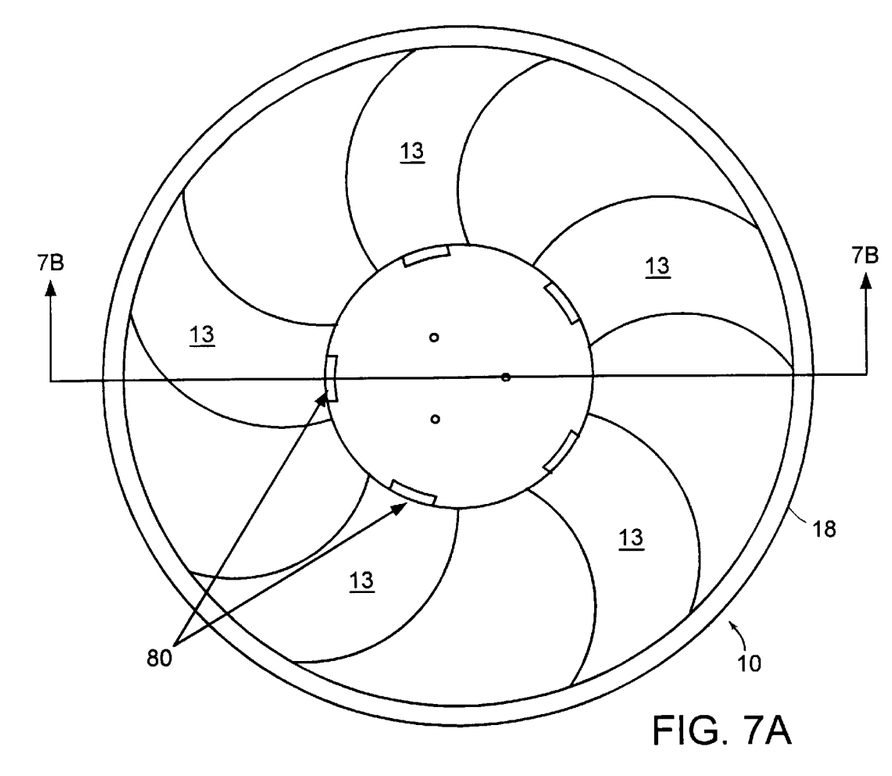
FIGS. 7A and 7B are diagrammatic views of an axial cooling fan having the impeller blades positioned in a cavity formed in the rear of the fan hub.
Figure 7B:
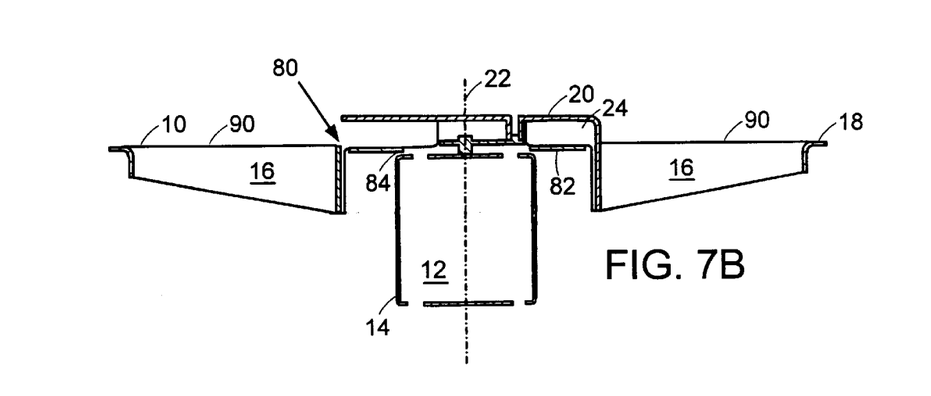

In the embodiment shown in FIGS. 7A and 7B, impeller blades 24 are molded integrally to the underside of hub 20 such that hub 20 serves as a bottom plate. A separate annular shaped top plate 82 is attached to the bottom of impeller blades 24 to form a series of flow paths, each flow path having two adjacent impeller blades on each side and having hub 20 and top plate 82 as the bottom and top sides, respectively. This arrangement enables the airflow, having exited the motor casing, to move through the defined flow paths and exit through slots 80 disposed around the periphery of hub 20. The location of slots 80 can be indexed such that each is positioned near the low pressure surface 13 of a blade 16. The clearance 84 defined by the spacing between the region near the inner radius of top plate 82 and motor casing 14 is minimized to form a seal to ensure that the airflow moves through the interior of the motor and not around the outside of the motor casing.

Figure 8A:
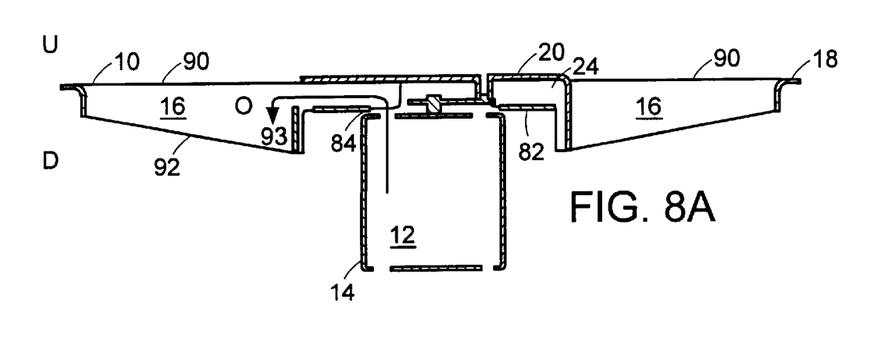
FIGS. 8A and 8B is a diagrammatic view of an axial cooling fan in which impeller outlets are located downstream of the leading edges of the fan blades.
Figure 8B:
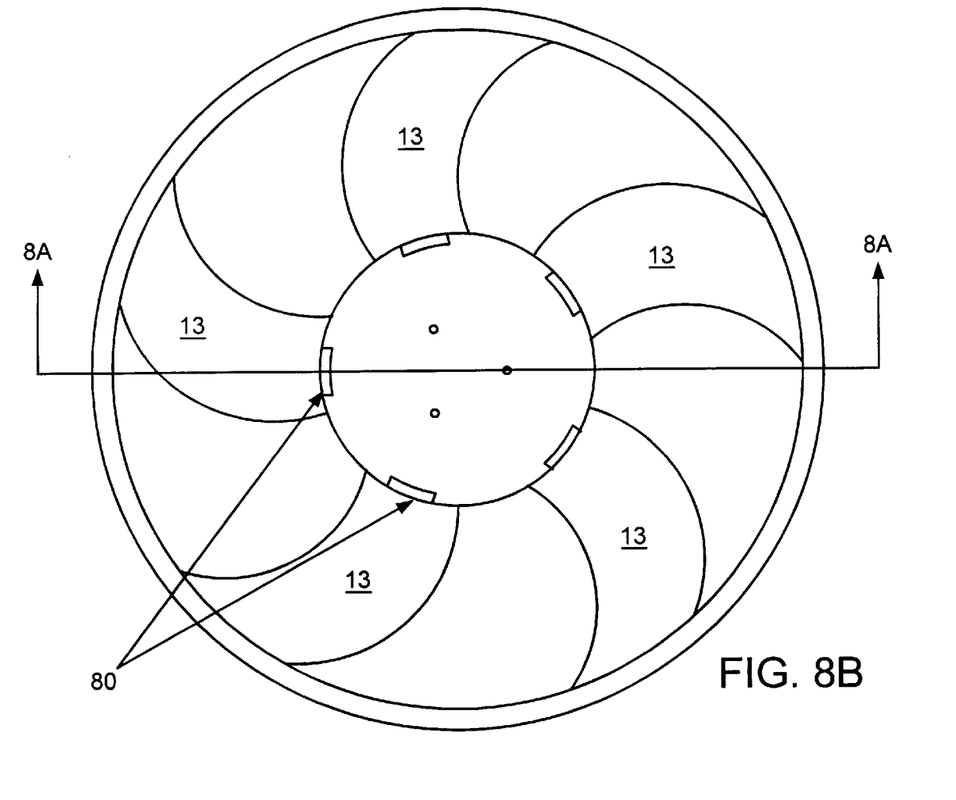

Shown in FIGS. 8A and 8B is a motor/fan combination where cooling air, flowing in the direction of arrow 93, exits motor casing 14, flows through impeller blades 24, and exits through impeller outlet (O), where the outlet (O) is located downstream of the leading edges 90 and upstream of the trailing edges 92 of fan blades 16. The other identified elements are similar to those described above.

Figure 9:
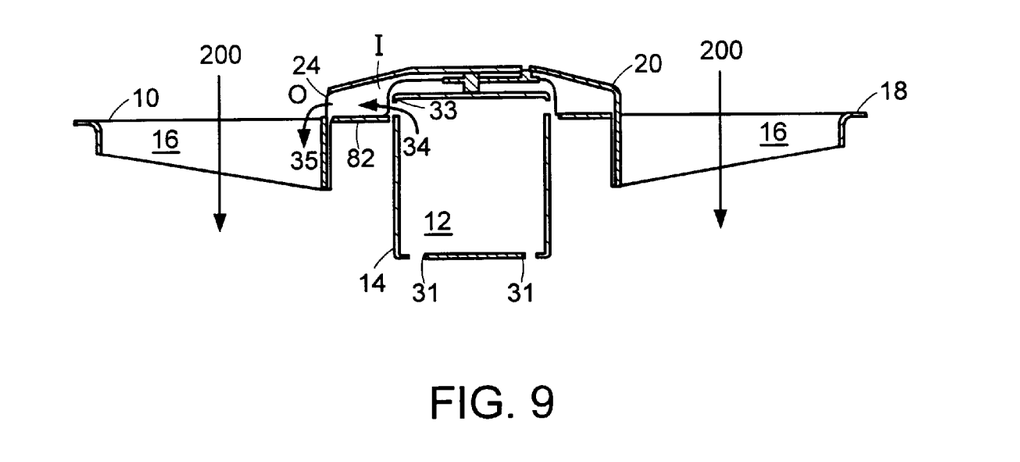
FIG. 9 is a diagrammatic view of a fan/motor combination where the motor casing has cooling apertures positioned so that cooling air exits radially.

Referring to FIG. 9, motor casing 14 includes cooling apertures 33 located on the side of motor casing 14 and near the inlet (I) of impeller blades 24. With this configuration, motor cooling air exits motor casing 14 through cooling apertures 33 in a generally radial, as indicated by arrows 34, and tangential direction. The cooling airflow moves through impeller blades 24 and exits the impeller at the outlet (O) of the impeller blades. As indicated by arrow 35, the cooling airflow moves from the outlet and enters the mainstream airflow moving in the general direction of arrows 200. This embodiment may have the additional benefit of reducing the overall package depth by moving the impeller blades to a position more generally along the side of the motor casing.

Other embodiments may incorporate one or more of the features described in reference to FIGS. 1 through 9 and are within the scope of the following claims.

What is claimed is:

1. An axial flow fan and motor combination comprising:

a) a fan hub connected to outwardly extending fan blades, the hub and fan blades being rotatable to produce an airflow from a region upstream of a fan blade leading edge, to a region downstream of a fan blade trailing edge;

b) an electric motor connected to rotate the fan hub; and c) a centrifugal impeller comprising rotating impeller blades, an impeller inlet, and an impeller outlet, the impeller outlet being positioned upstream of an intersection of the fan blade trailing edge and the hub, wherein the hub comprises a rearwardly-facing, concave, central region, constructed to serve as a bottom plate, and a top plate spaced axially rearward of the central hub region, the impeller blades being positioned in a space between the rearwardly-facing central region and the top plate.

2. An axial flow fan and motor combination comprising:

a) a fan hub connected to outwardly extending fan blades, the hub and fan blades being rotatable to produce an airflow from a region upstream of a fan blade leading edge, to a region downstream of a fan blade trailing edge;

b) an electric motor connected to rotate the fan hub; and c) a centrifugal impeller comprising rotating impeller blades, an impeller inlet, and an impeller outlet, the impeller outlet being positioned upstream of an intersection of the fan blade trailing edge and the hub, wherein the motor comprises an outer casing, and wherein at least part of the motor casing is configured to rotate with the impeller blades and the fan hub.

3. The combination of claim 2 wherein said impeller blades are integrally connected to said motor casing.

4. An axial flow fan and motor combination comprising:

a) a fan hub connected to outwardly extending fan blades, the hub and fan blades being rotatable to produce an airflow from a region upstream of a fan blade leading edge, to a region downstream of a fan blade trailing edge;

b) an electric motor connected to rotate the fan hub; and c) a centrifugal impeller comprising rotating impeller blades, an impeller inlet, and an impeller outlet, the impeller outlet being positioned upstream, from the perspective of motor-cooling airflow generated by the impeller, of an intersection of the fan blade trailing edge and the hub, wherein the motor comprises a sealed outer casing, and the impeller generates motor-cooling airflow along the outside of the motor casing.

5. An axial flow fan and motor combination comprising:

a) a fan hub connected to outwardly extending fan blades, the hub and fan blades being rotatable to produce an airflow from a region upstream of a fan blade leading edge, to a region downstream of a fan blade trailing edge;

b) an electric motor connected to rotate the fan hub; and c) a centrifugal impeller comprising rotating impeller blades, an impeller inlet, and an impeller outlet, the impeller outlet being positioned upstream of an intersection of the fan blade trailing edge and the hub, wherein the motor comprises an outer casing, and wherein at least a portion of the motor outer casing serves as a top plate.

6. The combination of claim 5 in which said motor casing includes a flange, said flange being constructed to serve as the top plate of said impeller.

7. An axial flow fan and motor combination comprising:

a) a fan hub connected to outwardly extending fan blades, the hub and fan blades being rotatable to produce an airflow from a region upstream of a fan blade leading edge, to a region downstream of a fan blade trailing edge;

b) an electric motor comprising a shaft and configured to rotate the shaft;

c) a centrifugal impeller comprising rotating impeller blades, an impeller inlet, and an impeller outlet, the impeller outlet being positioned upstream of an intersection of the fan blade trailing edge and the hub; and d) a rotatable motor driveplate connected to the motor shaft and the fan hub, and configured to communicate rotational force of the motor shaft to the fan hub.

8. The combination of claim 7 wherein said motor comprises a stationary outer casing, the combination further comprising a seal between said driveplate and said casing.

9. The combination of claim 7 wherein said driveplate serves as either a top plate or a bottom plate.

10. The combination of claim 7 wherein at least a portion of said impeller blades are attached to said driveplate, whereby motor driveplate rotation drives the impeller blades.

11. The combination of claim 10 wherein said impeller blades and said driveplate are made of metal.

12. The combination as in one of claims 1, 2, 4, 5 and 7, wherein said fan, said impeller blades and either said top plate, said bottom plate, or both, are molded as a single unit.

* * * * *